United States Patent
Koizumi 4,046,460
Sept. 6, 1977

[54] OBJECTIVE FOR VIDEO DISKS

[75] Inventor: Toshimichi Koizumi, Sagamihara, Japan

[73] Assignee: Olympus Optical Co., Ltd., Japan

[21] Appl. No.: 695,037

[22] Filed: June 11, 1976

[30] Foreign Application Priority Data

June 14, 1975   Japan .................................. 50-72255

[51] Int. Cl.² ............................................... G02B 9/60
[52] U.S. Cl. ............................... 350/216; 350/175 ML
[58] Field of Search ................ 350/216, 175 ML, 214, 350/220

[56] References Cited

U.S. PATENT DOCUMENTS

| 1,791,276 | 2/1931 | Konig | 350/175 ML |
| 3,887,269 | 6/1975 | Nakagawa | 350/216 |

*Primary Examiner*—John K. Corbin
*Assistant Examiner*—Conrad Clark
*Attorney, Agent, or Firm*—Cushman, Darby & Cushman

[57] ABSTRACT

An objective for video disks comprising five lens components of single lenses for which the numerical aperture on the recording surface side is large, working distance is large and aberrations especially spherical aberration and coma are corrected favourably. Besides, said objective for video disks is arranged so that it can be used also for rays from infinite distance by varying an airspace between a second and third lens components.

5 Claims, 21 Drawing Figures

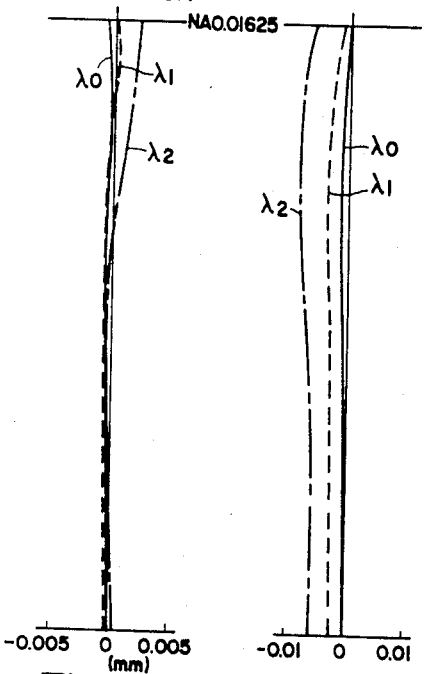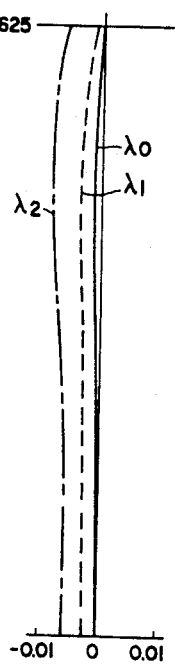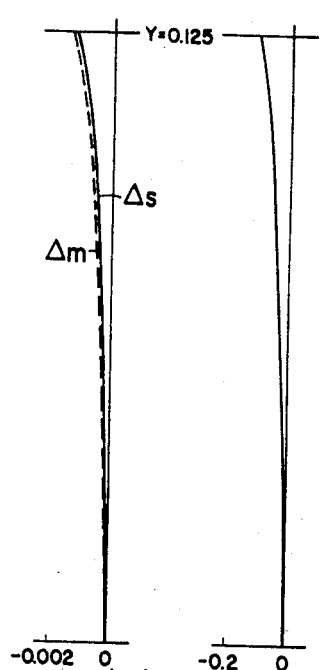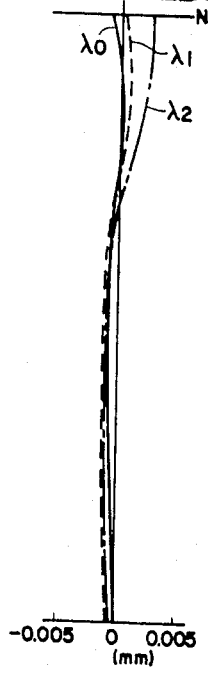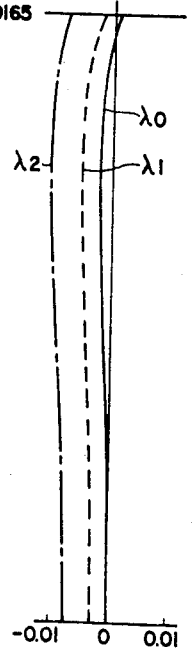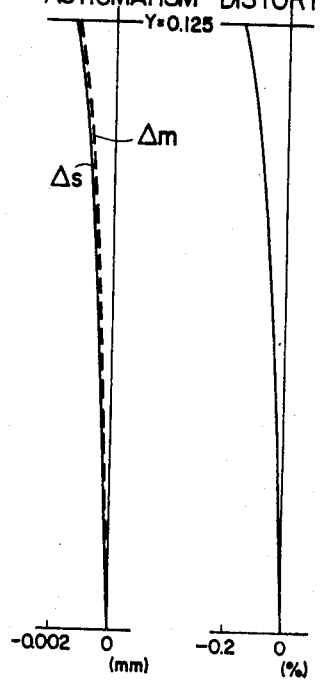

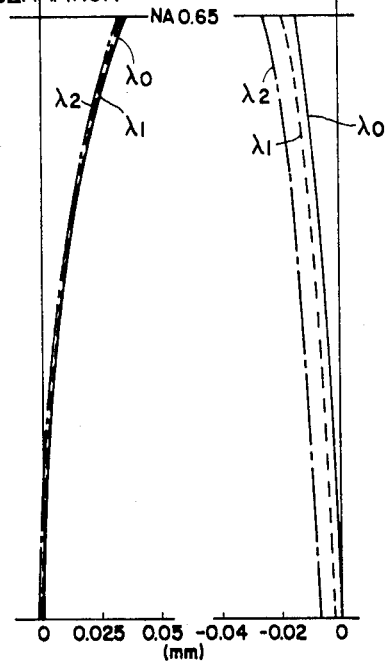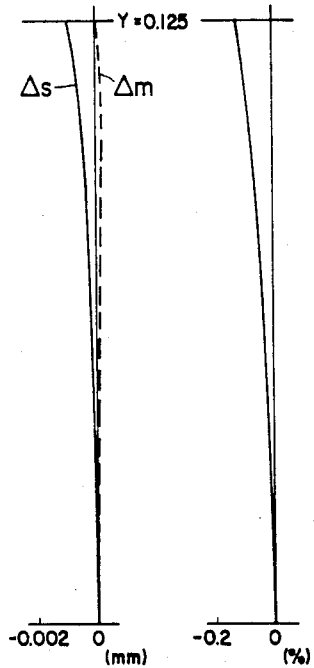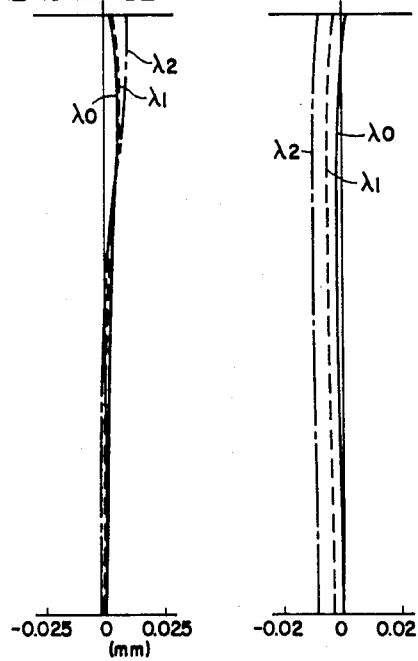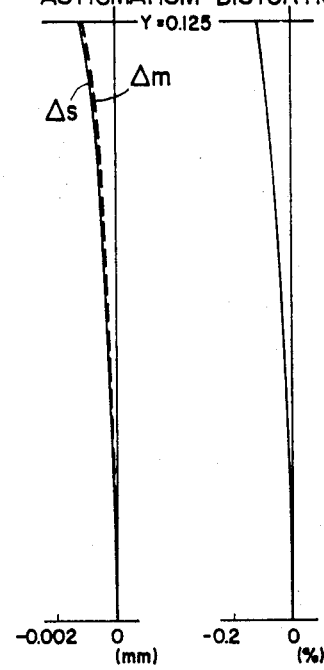

OBJECTIVE FOR VIDEO DISKS

BACKGROUND OF THE INVENTION

1. Field of the Invention

The present invention relates to an objective for video disks and, more particularly, to an objective for video disks with high reduction ratio to be used for recording the modulated signals when making a master disk of photoelectric video disks.

2. Description of the Prior Art

For recording of modulated signals for making the master disk of photoelectric video disks, an objective designed exclusively for said purpose has not yet been known and, therefore, microscope objectives have been generally utilized for the purpose. Due to the fact that a single wavelength in the range of 435.8 nm (g line) to 486.1 nm is used as the recording signal wavelength for recording of modulated signals, it was possible to obtain recording results of somewhat satisfactory level even when such microscope objectives are used. However, microscope objectives have many cemented lens surfaces therein and, moreover, their chromatic aberration is corrected in respect to rays in the range of visible radiation. Therefore, by microscope objectives, it is impossible to record the signals with high accuracy because of the influence of aberrations. Especially when a ray in ultraviolet range (for example, a ray of wavelength 351 nm) is used for the purpose of high-density recording, absorption of light by the binding agent used on said cemented surfaces occurs in addition to influence of chromatic aberration and, consequently, transparency decreases.

Regarding the performance of objectives for recording, the following properties are especially required: (1) transparency should be high for rays up to the near ultraviolet radiation or up to the ultraviolet radiation, (2) the resolving power should be high, (3) influence of diffracted rays other than the zero order should be minimized, and (4) contrast of the image should not decrease.

To satisfy the requirement (1) out of the above, it is necessary to select a proper glass material and to prevent absorption of light by the binding agent on the cemented surface. As for the requirement (2), it is necessary to make the numerical aperture as large as possible. As for requirements (3) and (4), it is necessary to correct aberrations favourably and to minimize spherical aberration and coma especially. As for the requirement (4), it is further required to prevent flare. When the objective has a cemented surface, condition of cementing should be taken into consideration in addition to transparency, flare, etc. Because, if the cemented condition of the cemented surface is not good, noise corresponding to the cemented condition will be recorded together with the modulated waves. Moreover, as the incident light is converged into a fine beam, energy of light which passes through a unit area of respective lens surfaces is extremely large and, consequently, disconnection of cemented surface may be sometimes caused. A master disk for recording is made of a base disk of metal, glass, etc. coated with a light-sensitive agent such as "Photoresist". The surface of said light-sensitive agent is exposed to the modulated light which has passed through and been converged by the objective. In case of modulated laser beam, the beam which reaches the surface of light-sensitive surface is converged to a diameter of 1 $\mu$ or less. Therefore, temperature of the portion exposed to the beam becomes very high and the light-sensitive agent will be evaporated. If the evaporated matter sticks to the objective, contrast of image and resolving power of the objective will decrease.

SUMMARY OF THE INVENTION

It is, therefore, a primary object of the present invention to provide an objective for video disks comprising single lenses only and, therefore, not having a cemented lens surface for which the numerical aperture on the recording surface side is large and, moreover, for which the working distance is comparatively large.

The objective for video disks according to the present invention is a lens system of five-component five-element lens configuration comprising single lenses which are divided into a front lens group and rear lens group by providing a large airspace between said front and rear lens groups. Said front lens group comprises a first, second and third lens components, said first lens component being a biconvex lens, said second lens component being a negative lens having a concave surface of strong negative refractive power which is concave toward said first lens component, said third lens component being a biconvex lens. Said rear lens group, comprises a fourth lens component and fifth lens component, said fourth lens component being a positive meniscus lens which is convex toward said front lens group, said fifth lens component being a positive meniscus lens which is approximately hemispherical and is convex toward said fourth lens component. Besides, the objective for video disks according to the present invention is arranged to satisfy the following conditions when reference symbol $f$ represents the focal length of the lens system as a whole, reference symbol $f_F$ represents the total focal length of the front lens group, reference symbol $f_R$ represents the total focal length of the rear lens group, reference symbol $r_2$ represents the radius of curvature of the rear surface of the first lens component, reference symbol $r_3$ represents the radius of curvature of the front surface of the second lens component, reference symbol $d_2$ represents the airspace between the first and second lens components, and reference symbol $d_6$ represents the airspace between the front and rear lens groups.

$1.19 \geq d_6/f \geq 0.62$      (1)
$3.7 \geq f_F/f \geq 2.7$      (2)
$0.29 \geq f_R/f_F \geq 0.19$      (3)
$0.86 \geq |r_3|/|r_2| \geq 0.6$      (4)
$0.15 \geq d_2/f \geq 0.11$      (5)

In the lens system as described in the above, the front lens group is arranged to chiefly correct chromatic aberration, and it is possible to correct chromatic aberration by making the refractive index of the lens having negative refractive power different from refractive indices of lenses having positive refractive powers or by making the refractive index of the lens having negative refractive power large. For example, it is desirable to make the difference $n_2 - n_1$ between the refractive index $n_1$ of the first lens component and refractive index $n_2$ of the second lens component as $n_2 - n_1 \geq 0.15$ and the difference $n_2 - n_3$ between the refractive index $n_2$ of the second lens component and refractive index $n_3$ of the third lens component as $n_2 - n_3 \geq 1.5$ and to make Abbe's numbers $\nu_1$, $\nu_2$, and $\nu_3$ of the first, second and third lens components respectively as $\nu_1 > 55$, $\nu_2 > 40$ and $\nu_3 > 55$. When, however, the refractive index $n_2$ of the lens having negative refractive power is made too large, transparency will decrease in case of some kinds of glass materials. Therefore, especially for dense flint type glass materials, it is necessary to make said refractive index $n_2$ as $n_2 < 1.7$.

The rear lens group is to converge the rays from the front lens group and, therefore, the energy per unit area of rays which pass through each lens component will become high. So, it is necessary to prevent deterioration of the lens system by using, for example, fused quartz as lens material.

Besides, in the present invention, it is possible to favourably correct aberrations of the lens system as a whole balancing said aberrations favourably by arranging so that the lens system satisfies the afore-mentioned respective conditions.

If the airspace $d_6$ between the front and rear lens groups in the condition (1) becomes $d_6/f > 1.19$, astigmatism will be corrected favourably. However, it is not desirable because spherical aberration and coma will tend to be overcorrected. If, on the contrary, it becomes $d_6/f < 0.62$, astigmatism will be aggravated and will become a very large positive value progressively toward the marginal portion. Moreover, the astigmatic difference will increase.

If, in the condition (2), the total focal length $f_F$ of the front lens group becomes $f_F/f > 3.7$, coma will tend to be overcorrected. If, on the contrary, the total focal length $f_F$ becomes $f_F/f < 2.7$, coma will tend to be undercorrected.

If, in the condition (3), the ratio $f_R/f_F$ of the total focal length $f_R$ of the rear lens group to the total focal length $f_F$ of the front lens group defined by the above-mentioned condition (2) becomes $f_R/f_F > 0.29$ exceeding the upper limit, paraxial spherical aberration at the marginal portion will be undercorrected. If, on the contrary, the ratio $f_R/f_F$ becomes $f_R/f_F < 0.19$, asymmetry of coma will be caused.

The condition (4) relates to the ratio $|r_3|/|r_2|$ between the radius of curvature $r_2$ of the rear surfaces of the first lens component and the radius of curvature $r_3$ of the front surface of the second lens component and is established for the purpose of correcting chromatic aberrations. If it becomes $|r_3|/|r_2| > 0.86$ in the condition (4), chromatic aberration will tend to be undercorrected. If it becomes $|r_3|/|r_2| < 0.6$, chromatic aberration will tend to be overcorrected. For correction of chromatic aberration, of course it is desirable to make the difference between refractive indices of the first and second lens components large, i.e., $n_2 - n_1 \geq 0.15$ as described before. Moreover, it is easier to correct chromatic aberration of spherical aberration when the radius of curvature $r_2$ of the rear surface of the first lens component is selected within the range of $1.6 \geq |r_2|/f \geq 1.3$.

As for the condition (5), spherical aberration will be undercorrected and the astigmatic difference will increase if the airspace $d_2$ between the first and second lens components becomes $d_2/f > 0.15$. If the airspace $d_2$ becomes $d_2/f < 0.11$, astigmatism will be aggravated and will become a very large value progressively toward the marginal portion.

The above-mentioned objective for video disks according to the present invention is arranged to focus an image of a light source located at a limited distance onto a recording surface. To make a master disk for photoelectric video disks, it is sometimes required to record the rays from infinite distance. If the above-mentioned objective for video disks is used for rays from infinite distance as it is, aberrations will be aggravated. To arrange the objective, which is designed for recording the rays from the light source at a limited distance, so that it can be used also for rays from infinite distance also in favourable state, the following methods may be considered.

One method is to additionally provide a negative lens, which has the focal point at the position of the light source located at a limited distance, on the object side of the objective. By this method, paraxial rays from infinite distance passed through the added negative lens become equal to rays from the light source located at a limited distance. Another method is to advance a part of lenses in the lens system in order to correct aggravation of aberrations to be caused when the lens system is used for rays from infinite distance. In the objective according to the present invention, the latter method is adopted. That is, the objective according to the present invention is arranged to vary the airspace between the second and third lens components by integrally advancing the first and second lens components in order to favourably correct aberrations for rays from infinite distance. The range of the most preferable amount of variation $\Delta d_4$ of the airspace $d_4$ for attaining the above-mentioned object is defined by the following condition.

$$0.5 > \Delta d_4/f > 0.2 \qquad (6)$$

When the objective for the light source at a limited distance is used for rays from infinite distance as it is, overcorrection of spherical aberration occurs, and this is corrected favourably when said amount of variation $\Delta d_4$ is within the range defined by the condition (6). If the amount of variation $\Delta d_4$ becomes $\Delta d_4/f < 0.2$, spherical aberration will remain still overcorrected. On the other hand, if it becomes $\Delta d_4/f > 0.5$, spherical aberration will be undercorrected and, moreover, sine condition will be overcorrected.

BRIEF DESCRIPTION OF THE DRAWINGS

FIGS. 3A, 3B, 3C and 3D respectively show graphs illustrating aberration curves of the Embodiment 2 of the present invention;

FIGS. 4A, 4B, 4C and 4D respectively show graphs illustrating aberration curves of the Embodiment 3 of the present invention;

FIGS. 5A, 5B, 5C and 5D respectively show graphs illustrating aberration curves of the Embodiment 1 when it is used for rays from infinite distance without correcting aberrations; and FIGS. 6A, 6B, 6C and 6D respectively show aberration curves of the Embodiment 1 after aberrations are corrected by integrally advancing the first and second lens components.

DETAILED DESCRIPTION OF THE PREFERRED EMBODIMENTS

Figure 1:
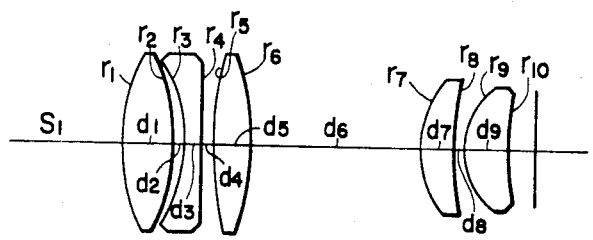
FIG. 1 shows a sectional view of the objective according to the present invention.

Preferred embodiments of the objective for video disks according to the present invention are as shown below.

---

Embodiment 1

$f = 1.0$ (where $\lambda = 441.6$ nm)
$r_1 = 2.5497$

-continued

| | | |
|---|---|---|
| $d_1 = 0.4130$ | $n_1 = 1.46654$ | $\nu_1 = 67.8$ |
| $r_2 = -1.4234$ | | |
| $d_2 = 0.1335$ | | |
| $r_3 = -1.1452$ | | |
| $d_3 = 0.1551$ | $n_2 = 1.69827$ | $\nu_2 = 32.1$ |
| $r_4 = -123.191$ | | |
| $d_4 = 0.0703$ | | |
| $r_5 = 2.1641$ | | |
| $d_5 = 0.3968$ | $n_3 = 1.46654$ | $\nu_3 = 67.8$ |
| $r_6 = -2.7165$ | | |
| $d_6 = 1.0766$ | | |
| $r_7 = 0.7955$ | | |
| $d_7 = 0.2705$ | $n_4 = 1.46654$ | $\nu_4 = 67.8$ |
| $r_8 = 6.0546$ | | |
| $d_8 = 0.0252$ | | |
| $r_9 = 0.3778$ | | |
| $d_9 = 0.2777$ | $n_5 = 1.52564$ | $\nu_5 = 64.1$ |
| $r_{10} = 0.7704$ | | |
| $\beta = -1/40$ | $S_1 = -38.302$ | $S = 0.224$ |
| $f_F = 3.354$ | $f_R = 0.737$ | |

Embodiment 2
$f = 1.0$ (where $\lambda = 441.6$ nm)

| | | |
|---|---|---|
| $r_1 = 2.5437$ | | |
| $d_1 = 0.4119$ | $n_1 = 1.46654$ | $\nu_1 = 67.8$ |
| $r_2 = -1.4293$ | | |
| $d_2 = 0.1349$ | | |
| $r_3 = -1.1468$ | | |
| $d_3 = 0.1439$ | $n_2 = 1.69827$ | $\nu_2 = 32.1$ |
| $r_4 = -101.4317$ | | |
| $d_4 = 0.0547$ | | |
| $r_5 = 2.1904$ | | |
| $d_5 = 0.3958$ | $n_3 = 1.46654$ | $\nu_3 = 67.8$ |
| $r_6 = -2.7085$ | | |
| $d_6 = 1.0741$ | | |
| $r_7 = 0.7936$ | | |
| $d_7 = 0.2698$ | $n_4 = 1.46654$ | $\nu_4 = 67.8$ |
| $r_8 = 6.0349$ | | |
| $d_8 = 0.0270$ | | |
| $r_9 = 0.3806$ | | |
| $d_9 = 0.2788$ | $n_5 = 1.52564$ | $\nu_5 = 64.1$ |
| $r_{10} = 0.7966$ | | |
| $\beta = -1/40$ | $S_1 = 38.401$ | $S = 0.219$ |
| $f_F = 3.366$ | $f_R = 0.735$ | |

Embodiment 3
$f = 1.0$ (where $\lambda = 441.6$ nm)

| | | |
|---|---|---|
| $r_1 = 2.0768$ | | |
| $d_1 = 0.4352$ | $n_1 = 1.46654$ | $\nu_1 = 67.8$ |
| $r_2 = -1.5056$ | | |
| $d_2 = 0.1394$ | | |
| $r_3 = -1.1772$ | | |
| $d_3 = 0.1399$ | $n_2 = 1.69827$ | $\nu_2 = 32.1$ |
| $r_4 = 43.5465$ | | |
| $d_4 = 0.0567$ | | |
| $r_5 = 1.6841$ | | |
| $d_5 = 0.4969$ | $n_3 = 1.46654$ | $\nu_3 = 67.8$ |
| $r_6 = -3.6017$ | | |
| $d_6 = 0.6995$ | | |
| $r_7 = 0.8045$ | | |
| $d_7 = 0.3576$ | $n_4 = 1.46654$ | $\nu_4 = 67.8$ |
| $r_8 = 2.6438$ | | |
| $d_8 = 0.0198$ | | |
| $r_9 = 0.3845$ | | |
| $d_9 = 0.2663$ | $n_5 = 1.52564$ | $\nu_5 = 64.1$ |
| $r_{10} = 0.9430$ | | |
| $\beta = -1/40$ | $S_1 = 38.545$ | $S = 0.2164$ |
| $f_F = 3.036$ | $f_R = 0.786$ | |

In the above-mentioned respective embodiments, reference symbols $r_1$ through $r_{10}$ respectively represent radii of curvature of respective surfaces of respective lenses, reference symbols $d_1$ through $d_9$ respectively represent thicknesses of respective lenses and airspaces between respective lenses, reference symbols $n_1$ through $n_5$ respectively represent refractive indices of respective lenses for the wavelength of $\lambda = 441.6$ nm, reference symbols $\nu_1$ through $\nu_5$ respectively represent Abbe's numbers of respective lenses for $d$ line, reference symbol $f$ represents the focal length of the system as a whole, reference symbol $f_F$ represents the total focal length of the front lens group, reference symbol $f_R$ represents the total focal length of the rear lens group, reference symbol $\beta$ represents magnification, reference symbol $S_1$ represents the distance from the light source to the front lens surface of the lens system, and reference symbol S represents the distance from the rear lens surface of the lens system to the recording surface.

Figures 2A, 2B:
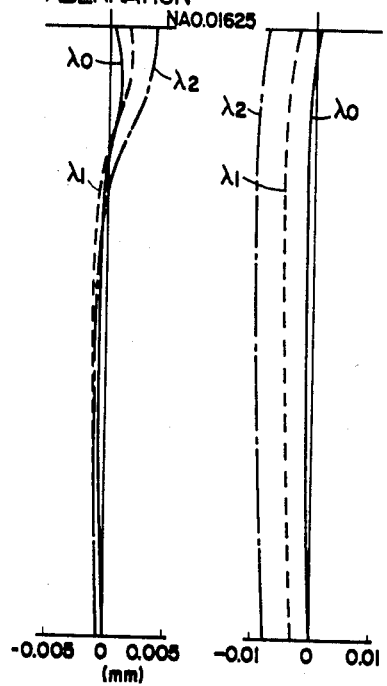
FIGS. 2A, 2B, 2C and 2D respectively show graphs illustrating aberration curves of the Embodiment 1 of the present invention.
Figures 2C, 2D:
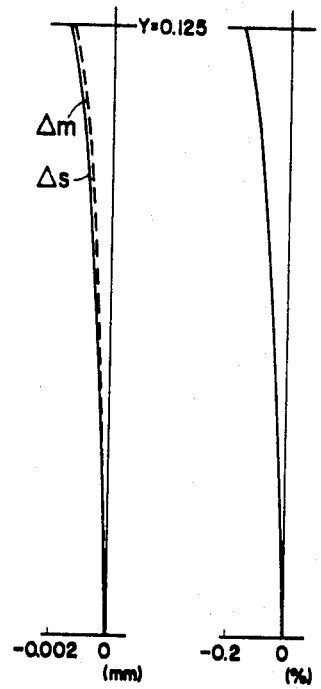

Aberration curves of respective embodiments shown in the above are illustrated in FIGS. 2A, 2B, 2C and 2D, FIGS. 3A, 3B, 3C and 3D, and FIGS. 4A, 4B, 4C and 4D. When the lens system of the Embodiment 1 is used for rays from infinite distance, aberrations will be corrected favourably when the airspace $d_4$ is varied by $0.309f$. Aberration curves of the Embodiment 1 when it is used for rays from infinite distance without varying the airspace $d_4$ are as shown in FIGS. 5A, 5B, 5C and 5D, while aberration curves when the airspace $d_4$ is varied by $0.309f$ are as shown in FIGS. 6A, 6B, 6C and 6D. As it is evident from said figures, aggravation of aberrations when the lens system is used for rays from infinite distance is favourably corrected by varying the airspace $d_4$.

I claim:

1. An objective for video disks comprising a front lens group and rear lens group, said front lens group comprising a first, second and third lens components, said rear lens group comprising a fourth and fifth lens components, said first lens component being a biconvex lens, said second lens component being a negative lens concave toward said first lens component, said third lens component being a biconvex lens, said fourth lens component being a positive meniscus lens convex toward said third lens component, said fifth lens component being a positive meniscus lens convex toward said fourth lens component, said objective for video disks satisfying the following conditions:

$$1.19 \geq d_6/f \geq 0.62 \quad (1)$$
$$3.7 \geq f_F/f \geq 2.7 \quad (2)$$
$$0.29 \geq f_R/f_F \geq 0.19 \quad (3)$$
$$0.86 \geq |r_3|/|r_2| \geq 0.6 \quad (4)$$
$$0.15 \geq d_2/f \geq 0.11 \quad (5)$$

wherein reference symbol $f$ represents the focal length of the lens system as a whole, reference symbol $f_F$ represents the total focal length of the front lens group, reference symbol $f_R$ represents the total focal length of the rear lens group, reference symbols $r_2$ represents the radius of curvature of the rear surface of the first lens component, reference symbol $r_3$ represents the radius of curvature of the front surface of the second lens component, reference symbol $d_2$ represents the airspace between the first and second lens components, and reference symbol $d_6$ represents the airspace between the front and rear lens groups.

2. An objective for video disks according to claim 1, in which said objective for video disks is further arranged to correct aberrations by varying the airspace $d_4$ between said second and third lens components within the range defined by the condition (6) shown hereunder so that said objective for video disks will be used also for rays from infinite distance:

$$0.5 > \Delta d_4/f > 0.2 \quad (6)$$

wherein reference symbol $\Delta d_4$ represents the amount of variation of the airspace $d_4$ between the second and third lens components.

3. An objective for video disks according to claim 1, in which said objective for video disks has the following numerical data:

$f = 1.0$ (where $\lambda = 441.6$ nm)
$r_1 = 2.5497$

-continued

| | | |
|---|---|---|
| $d_1 = 0.4130$ | $n_1 = 1.46654$ | $\nu_1 = 67.8$ |
| $r_2 = -1.4234$ | | |
| $d_2 = 0.1335$ | | |
| $r_3 = -1.1452$ | | |
| $d_3 = 0.1551$ | $n_2 = 1.69827$ | $\nu_2 = 32.1$ |
| $r_4 = -123.191$ | | |
| $d_4 = 0.0703$ | | |
| $r_5 = 2.1641$ | | |
| $d_5 = 0.3968$ | $n_3 = 1.46654$ | $\nu_3 = 67.8$ |
| $r_6 = -2.7165$ | | |
| $d_6 = 1.0766$ | | |
| $r_7 = 0.7955$ | | |
| $d_7 = 0.2705$ | $n_4 = 1.46654$ | $\nu_4 = 67.8$ |
| $r_8 = 6.0546$ | | |
| $d_8 = 0.0252$ | | |
| $r_9 = 0.3778$ | | |
| $d_9 = 0.2777$ | $n_5 = 1.52564$ | $\nu_5 = 64.1$ |
| $r_{10} = 0.7704$ | | |
| $\beta = -1/40$ | $S_1 = -38.302$ | $S = 0.224$ |
| $f_F = 3.354$ | $f_R = 0.737$ | | wherein respective embodiments, reference symbols $r_1$ through $r_{10}$ respectively represent radii of curvature of respective surfaces of respective lenses, reference symbols $d_1$ through $d_9$ respectively represent thicknesses of respective lenses and airspaces between respective lenses, reference symbols $n_1$ through $n_5$ respectively represent refractive indices of respective lenses for the wavelength of $\lambda = 441.6$ nm, reference symbols $\nu_1$ through $\nu_5$ respectively represent Abbe's numbers of respective lenses for $d$ line, reference symbol $f$ represents the focal length of the lens system as a whole, reference symbol $f_F$ represents the total focal length of the front lens group, reference symbol $f_R$ represents the total focal length of the rear lens group, reference symbol $\beta$ represents magnification, reference symbol $S_1$ represents the distance from the light source to the front lens surface of the lens system, and reference symbol S represents the distance from the rear lens surface of the lens system to the recording surface.

4. An objective for video disks according to claim 1, in which said objective for video disks has the following numerical data:

| $f = 1.0$ (where $\lambda = 441.6$ nm) | | |
|---|---|---|
| $r_1 = 2.5437$ | | |
| $d_1 = 0.4119$ | $n_1 = 1.46654$ | $\nu_1 = 67.8$ |
| $r_2 = -1.4293$ | | |
| $d_2 = 0.1349$ | | |
| $r_3 = -1.1468$ | | |
| $d_3 = 0.1439$ | $n_2 = 1.69827$ | $\nu_2 = 32.1$ |
| $r_4 = -101.4317$ | | |
| $d_4 = 0.0547$ | | |
| $r_5 = 2.1904$ | | |
| $d_5 = 0.3958$ | $n_3 = 1.46654$ | $\nu_3 = 67.8$ |
| $r_6 = -2.7085$ | | |
| $d_6 = 1.0741$ | | |
| $r_7 = 0.7936$ | | |
| $d_7 = 0.2698$ | $n_4 = 1.46654$ | $\nu_4 = 67.8$ |
| $r_8 = 6.0349$ | | |
| $d_8 = 0.0270$ | | |
| $r_9 = 0.3806$ | | |
| $d_9 = 0.2788$ | $n_5 = 1.52564$ | $\nu_5 = 64.1$ |
| $r_{10} = 0.7966$ | | |
| $\beta = -1/40$ | $S_1 = 38.401$ | $S = 0.219$ |
| $f_F = 3.366$ | $f_R = 0.735$ | | wherein respective embodiments, reference symbols $r_1$ through $r_{10}$ respectively represent radii of curvature of respective surfaces of respective lenses, reference symbols $d_1$ through $d_9$ respectively represent thicknesses of respective lenses and airspaces between respective lenses, reference symbols $n_1$ through $n_5$ respectively represent refractive indices of respective lenses for the wavelength of $\lambda = 441.6$ nm, reference symbols $\nu_1$ through $\nu_5$ respectively represent Abbe's numbers of respective lenses for $d$ line, reference symbol $f$ represents the focal length of the lens system as a whole, reference symbol $f_F$ represents the total focal length of the front lens group, reference symbol $f_R$ represents the total focal length of the rear lens group, reference symbol $\beta$ represents magnification, reference symbol $S_1$ represents the distance from the light source to the front lens surface of the lens system, and reference symbol S represents the distance from the rear lens surface of the lens system to the recording surface.

5. An objective for video disks according to claim 1, in which said objective for video disks has the following numerical data:

| $f = 1.0$ (where $\lambda = 441.6$ nm) | | |
|---|---|---|
| $r_1 = 2.0768$ | | |
| $d_1 = 0.4352$ | $n_1 = 1.46654$ | $\nu_1 = 67.8$ |
| $r_2 = -1.5056$ | | |
| $d_2 = 0.1394$ | | |
| $r_3 = -1.1772$ | | |
| $d_3 = 0.1399$ | $n_2 = 1.69827$ | $\nu_2 = 32.1$ |
| $r_4 = 43.5465$ | | |
| $d_4 = 0.0567$ | | |
| $r_5 = 1.6841$ | | |
| $d_5 = 0.4969$ | $n_3 = 1.46654$ | $\nu_3 = 67.8$ |
| $r_6 = -3.6017$ | | |
| $d_6 = 0.6995$ | | |
| $r_7 = 0.8045$ | | |
| $d_7 = 0.3576$ | $n_4 = 1.46654$ | $\nu_4 = 67.8$ |
| $r_8 = 2.6438$ | | |
| $d_8 = 0.0198$ | | |
| $r_9 = 0.3845$ | | |
| $d_9 = 0.2663$ | $n_5 = 1.52564$ | $\nu_5 = 64.1$ |
| $r_{10} = 0.9430$ | | |
| $\beta = -1/40$ | $S_1 = 38.545$ | $S = 0.2164$ |
| $f_F = 3.036$ | $f_R = 0.786$ | | wherein respective embodiments, reference symbols $r_1$ through $r_{10}$ respectively represent radii of curvature of respective surfaces of respective lenses, reference symbols $d_1$ through $d_9$ respectively represent thicknesses of respective lenses and airspaces between respective lenses, reference symbols $n_1$ through $n_5$ respectively represent refractive indices of respective lenses for the wavelength of $\lambda = 441.6$ nm, reference symbols $\nu_1$ through $\nu_5$ respectively represent Abbe's numbers of respective lenses for $d$ line, reference symbol $f$ represents the focal length of the lens system as a whole, reference symbol $f_F$ represents the total focal length of the front lens group, reference symbol $f_R$ represents the total focal length of the rear lens group, reference symbol $\beta$ represents magnification, reference symbol $S_1$ represents the distance from the light source to the front lens surface of the lens system, and reference symbol S represents the distance from the rear lens surface of the lens system to the recording surface.

* * * * *